United States Patent [19]

Kay et al.

[11] Patent Number: 4,650,390
[45] Date of Patent: Mar. 17, 1987

[54] STACKER-LOADER FOR STACKING DOUBLE SIDED PRINTED CIRCUIT BOARDS

[75] Inventors: Thomas Kay, Arlington Heights; Richard Overbeek, Addison; Paul Mallow, Lake in the Hills, all of Ill.

[73] Assignee: Wand Tool Company, Inc., Wheeling, Ill.

[21] Appl. No.: 610,690

[22] Filed: May 16, 1984

[51] Int. Cl.⁴ .............................................. B65G 57/06
[52] U.S. Cl. ........................................ 414/82; 414/76; 414/786
[58] Field of Search ..................... 198/782; 414/69, 76, 414/77, 82, 786, 80

[56] References Cited

U.S. PATENT DOCUMENTS

| | | | |
|---|---|---|---|
| 3,910,425 | 10/1975 | Mahara et al. | 414/82 X |
| 4,280,618 | 7/1981 | Jensen | 414/82 X |

FOREIGN PATENT DOCUMENTS

| | | | |
|---|---|---|---|
| 2744315 | 6/1978 | Fed. Rep. of Germany | 414/76 |
| 1098418 | 7/1955 | France | 414/82 |
| 0149945 | 11/1981 | Japan . | |

*Primary Examiner*—Joseph E. Valenza
*Assistant Examiner*—Janice Krizek
*Attorney, Agent, or Firm*—Laff, Whitesel, Conte & Saret

[57] ABSTRACT

A stacker-loader is positioned at the end of a conveyor line for receiving printed circuit boards as they follow each other in series or sequence along the conveyor. The stacker-loader converts the series of boards into a stack of boards, one aligned over the other on a cart which may be removed. The boards are so stacked without any one sliding over another, since the conductive strip lines on confronting boards might catch on each other. The stacker-loader comprises a field of driven rollers for the enabling of the boards to sequentially travel in series one after another when they leave the conveyor. A pair of spaced parallel cantilever arms are positioned to receive, between themselves, each of the printed circuit boards as it is delivered from the field of driven rollers. An aligned plurality of wheels are mounted on and extended from confronting surfaces of the cantilever arms for supporting the boards as they move along the arms. When the boards reach the end of the arms, the wheels are retracted to drop the boards supported thereby onto the cart.

14 Claims, 7 Drawing Figures

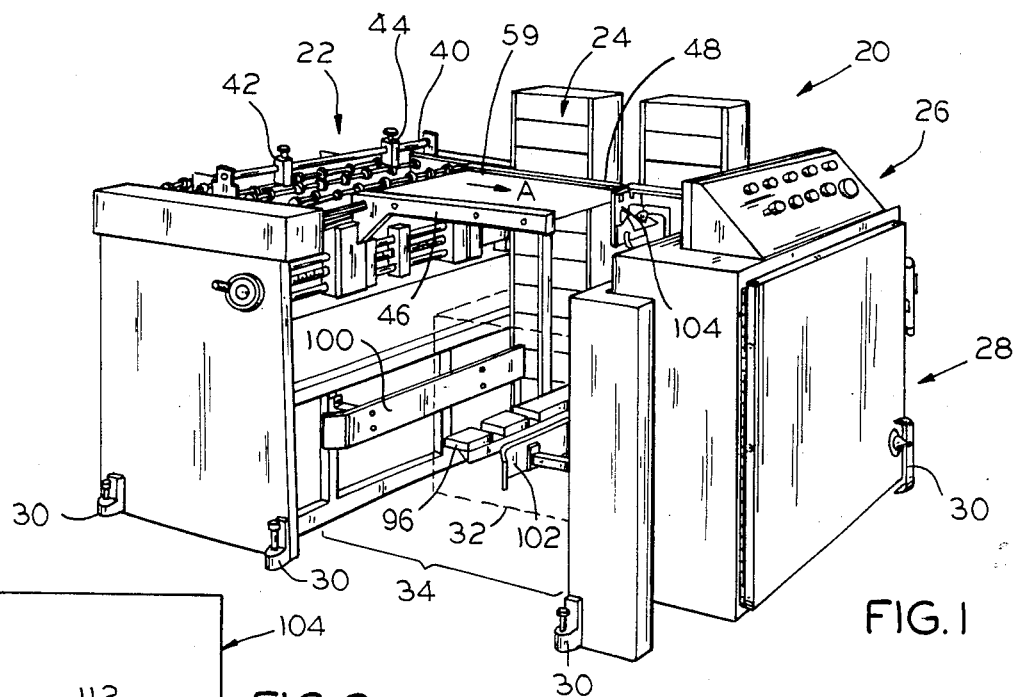
FIG. 1
FIG. 3
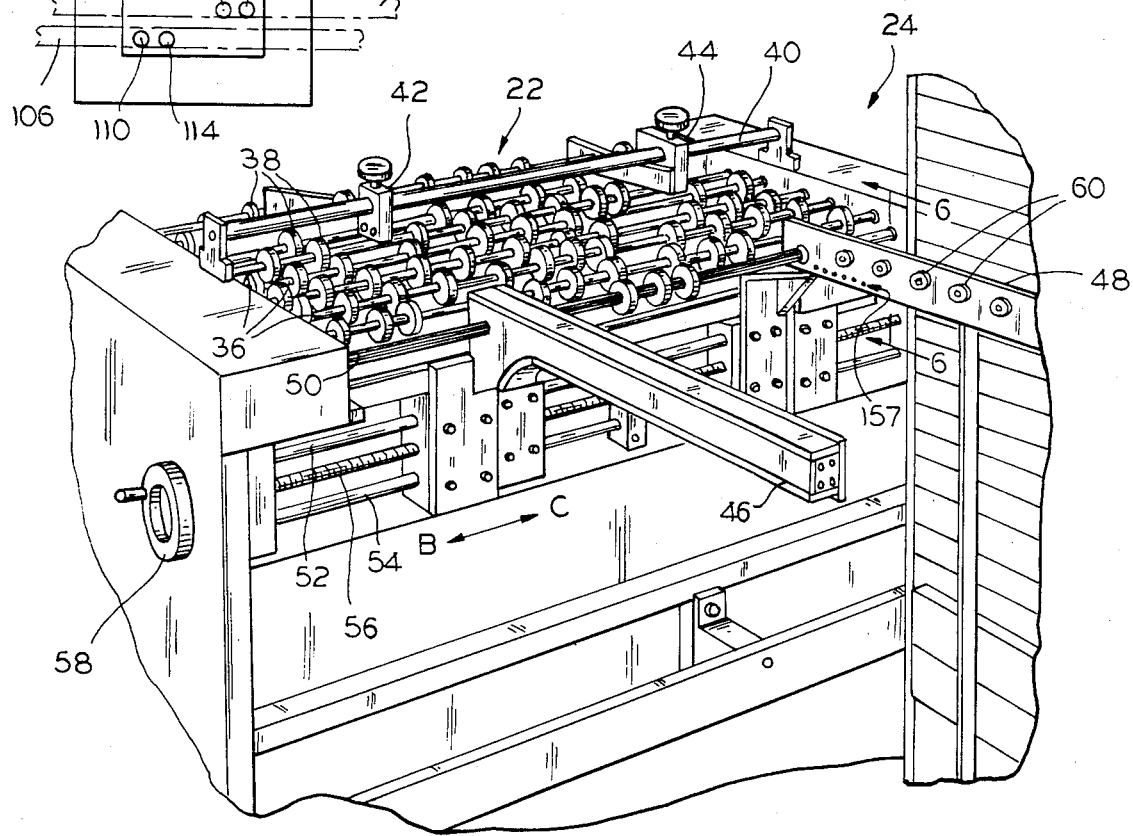
FIG. 2

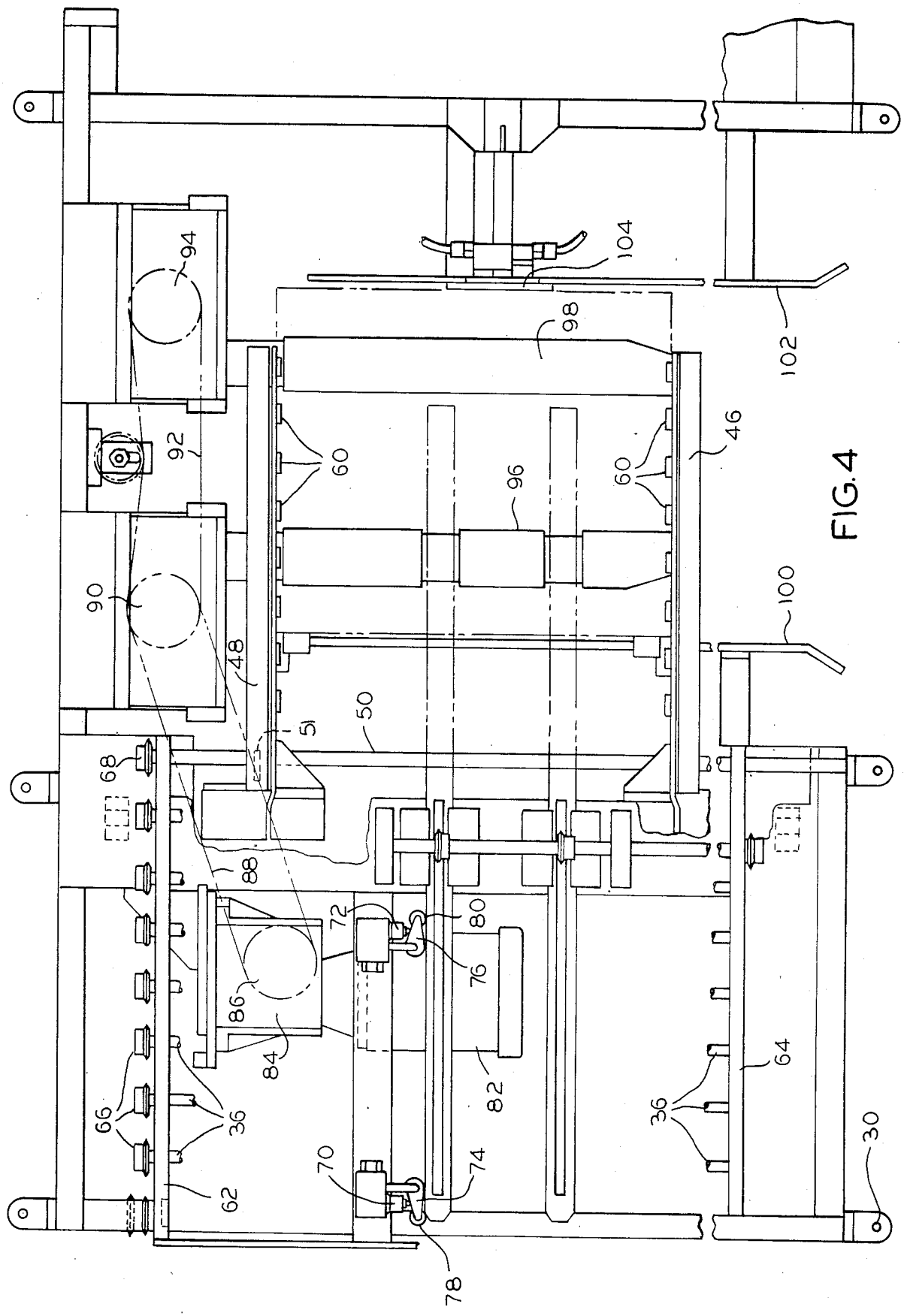

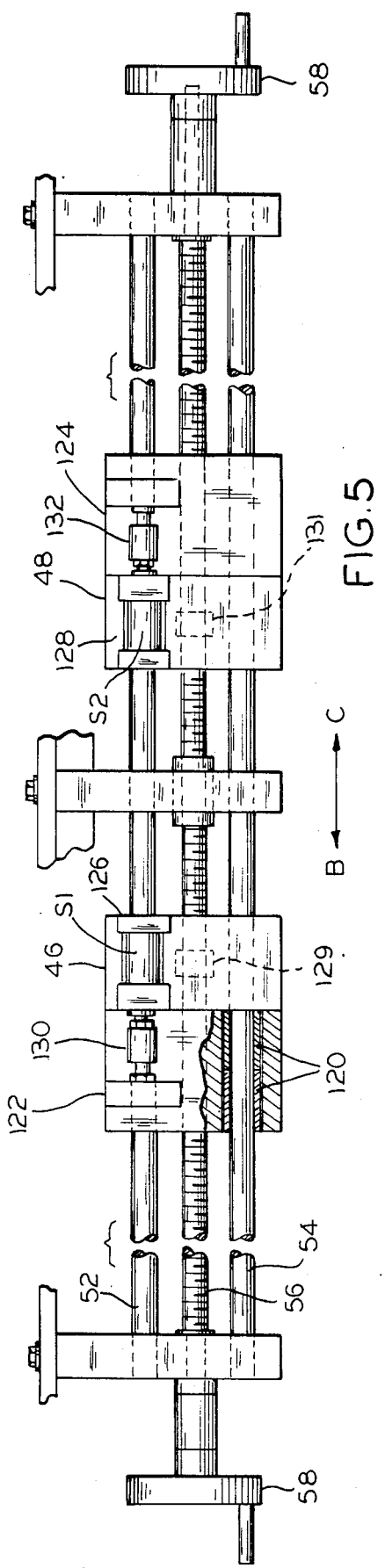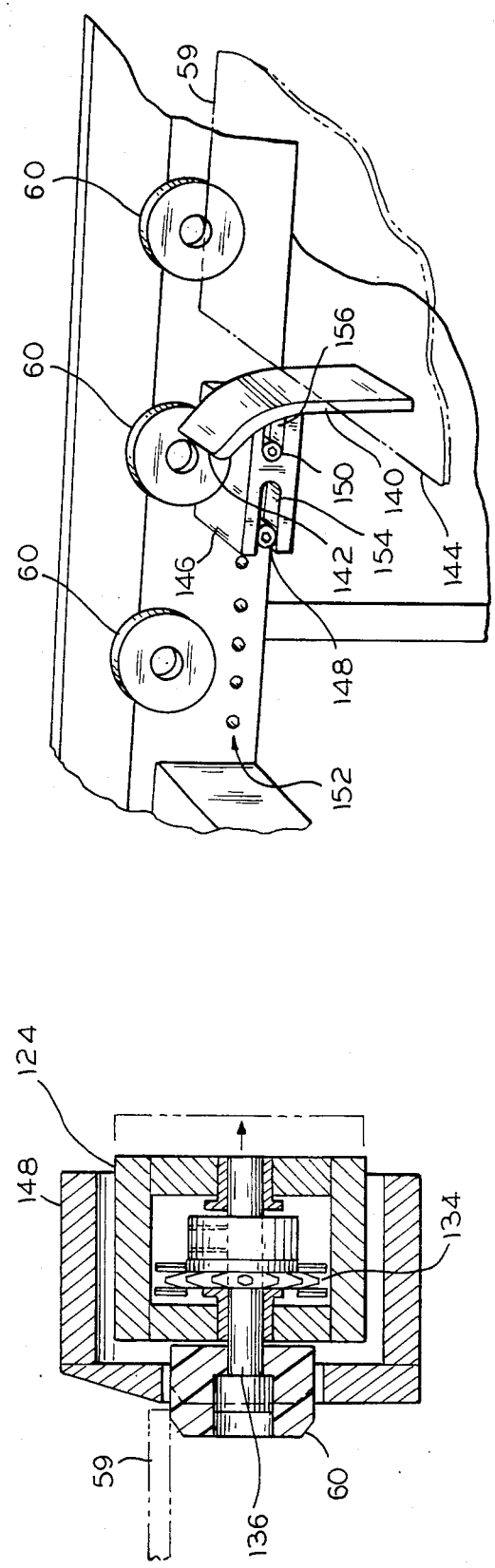

STACKER-LOADER FOR STACKING DOUBLE SIDED PRINTED CIRCUIT BOARDS

This invention relates to production tooling at the end of a conveyor for converting a series of plate-like articles into a stack of such articles and, more particularly, but not exclusively, to means for stacking double sided printed circuit boards at the end of their production line.

For convenience of expression, any and all plates which may be stacked by the inventive machine are hereinafter called either "printed circuit boards" or "plates". However, the invention is not necessarily limited to stacking printed circuit boards, per se, or to any other particular device.

Printed circuit boards are, of course, well known elements used in the manufacture of electronic apparatus. These boards have at least one, and sometimes two, copper clad sides which are etched in a wiring pattern through a use of a photographic process. After etching, the copper, or other metal, strip remains attached to the board to complete electrical connections between components mounted on the board.

In order to increase the density of the wiring and to enable metal strips to cross over each other without making electrical contact between them, it is common practice to form the metal strips on both sides of the insulating board (called a "double sided board"). The problem is that, if the copper strips are on opposite sides of printed circuit boards and if they slide one over the other in face-to-face contact, the strips on one side of one board might catch the strips on the confronting side of another board. This could result in damage to both boards. More important, the strips could be damaged in a manner which is not easily detected and that could lead to a failure of the electronic apparatus incorporating the damaged board. Therefore, extreme care should be taken not only to prevent damage to the printed circuit board, but also to preserve the integrity of the equipment which uses the board.

During the automated production of printed circuit boards, it is customary to move them in series from work station to work station, via a conveyor system. At the end of the process, the printed circuit boards are taken off the end of the conveyor and stacked into a cart or other transportable means. The act of stacking inherently involves transporting a printed circuit board from a moving conveyor to a point where the board stops over and becomes one of a plurality of parallel plates forming a stationary stack. Thus, there is a potential for scraping the bottom of the board as it is pushed onto the stack and for scraping the top when the next board is pushed over it. To avoid such scraping, most stacker-loaders involve some kind of a means for holding the corners of the board while it moves into the parallel position over the stack and then for dropping it onto the stack. Even this holding means often creates potential damage, since it may damage the board as it releases it to come to rest upon the stack.

Accordingly, an object of the invention is to provide new and improved means for and methods of handling and stacking flat plates, especially printed circuit boards, and even more especially, double sided printed circuit boards.

A further object is to provide means for removing printed circuit boards from a series on a moving conveyor line and for dropping them on the top of a stack of parallel boards.

In this connection, an object is to drop the boards in such a manner that a cushion of air tends to form momentarily under the dropped board to soften its fall.

Another object of the invention is to accomplish these and other objects at relatively low cost and with relatively simple and trouble free machinery.

In keeping with an aspect of the invention, these and other objects are accomplished by a conveyor for horizontally transporting printed circuit boards in series. Near the end of the conveyor, a pair of guides center the boards while they are still moving so that no static forces are exerted upon conductive strips on the face of the board. At the end of the conveyor, the printed circuit board is moved over a pair of spaced parallel wheels which support only the opposing spaced parallel edges of the board. Then, the wheels are withdrawn, horizontally, from under the edge of the board, to cause the board to drop with a flat and untipped attitude. A pair of sensors measure and control the height of the stack of printed circuit boards and the positioning of the oncoming printed circuit board so that the drop is only over a very small distance. This way, the board does not fall far enough to tip and also some air is partially entrapped between the bottom of the dropping board and the top of the stack. That entrapped air acts somewhat as a cushion to reduce the shock of the fall.

A preferred embodiment of the invention is shown in the attached drawings, wherein:

FIG. 1 is a perspective view of the inventive stacker-loader and of a console for controlling it;

FIG. 2 is a perspective view of the discharge end of the conveyor;

FIG. 3 is a front elevation of a sensor used to adjust and control the height of the stack and to detect the presence of a printed circuit board;

FIG. 4 is a top plan view of the inventive stacker-loader, a view looking down on the top of FIG. 2;

FIG. 5 is a fragmentary view of a part of the machine for adjusting the width of the delivery end to conform to the width of a printed circuit board, while nevertheless enabling the board to be dropped in a flat and untipped manner;

FIG. 6 is a cross sectional view taken along lines 6—6 in FIG. 2; and

FIG. 7 is a back guide for aligning the back edges of the printed circuit board above the stack.

The stacker-loader machine 20 of FIG. 1 includes a field of driven rollers 22 which propel printed circuit boards from any suitable conveyor in the direction A to a drop position 24. A control panel 26 may be used to control the operation of the stacker-loader. The panel 26 is part of control console 28 which may include either hard wired logic or a microprocessor. It is thought that the stacker-loader 20 may best be mounted on casters for movement to any convenient location, at the end of a production line. Therefore, suitable brakes 30 may be provided to immobilize the stacker-loader 20, after it is in place.

A cart 32 may be rolled into an open portion of the stacker-loader 20 to receive the printed circuit boards as they are stacked. When the cart 32 contains a full stack, it is wheeled away and replaced by another and empty cart.

The details of the field of driven rollers 22 and of the drop mechanism 24 are best seen in FIG. 2. There are a plurality of spaced parallel horizontal shafts (such as 36), each mounted at its opposite end in a journal for enabling it to undertake a rotary motion. Each shaft 36 has a number of rollers (such as 38) mounted thereon and affixed to turn therewith. The ends of each of the rods 36 have sprocket wheels (not shown) associated therewith, so that all rollers are turned in unison by a common bicycle chain. Therefore, if any printed circuit board is delivered from a conveyor to the field 22 of rollers 38, it is propelled smoothly and without scuffing by rollers turning at different speeds. Moreover, the rollers are so closely spaced that the boards are fully and stably supported.

A horizontal bar 40 is positioned above the field of rollers 22. Adjustably mounted on bar 40 are two guides which flare outwardly toward the input end (left, as viewed in FIG. 2) of the machine. Therefore, any printed circuit boards being propelled by the rotating field 22 of rollers 38 are guided into a space on the top which is defined by the guides 42, 44.

A pair of horizontal cantilever arms 46, 48, extending forward of the field 22 of rollers 38, are slidingly mounted on a splined shaft 50 and on a pair of smooth horizontal shafts 52, 54. The splined shaft transmits power to wheels 60 on arms 46, 48. A feedscrew 56 extends parallel to smooth shafts 52, 54. When feedscrew 56 is turned by cranks 58, the arms 46, 48 slide back and forth in the directions B-C and centered about a position over the stack forming on cart 32, along shafts 50-54. Therefore, by turning a crank 58, feedscrew 56 may be rotated, and arms 46, 48 may be moved together or apart to accommodate the width of the printed circuit board (one of which is seen at 59, FIG. 1). The guides 42, 44 are set so that any printed circuit board on rollers 38 is guided directly between the arms 46, 48.

Projecting from the inside vertical face of each of the cantilever arms 46, 48, are a plurality of horizontally aligned wheels, two of which are numbered 60 in FIG. 2. Therefore, each printed circuit board passing between guides 42, 44 rolls along these wheels 60. The wheels 60 project far enough to support the board; however, they do not project far enough to engage very much, and preferably none, of the conductive strips of printed circuit material. It is important for the rollers 38, and wheels 60 to rotate at exactly the same speed because a differential of peripheral roller and wheel speeds might scuff and abrade the surface of the printed circuit board.

The manner of controlling the roller speed is shown in FIGS. 4 and 6. The shafts 36 are rotatably mounted at their opposite ends in journal bearings supported by structural elements 62, 64 of the frame of stacker-loader 20. Each shaft has a sprocket wheel 66 on one end with a bicycle chain trained over it. The last of these sprocket wheels 68 is attached to and turned as a unit with the splined shaft 50. Therefore, all of the shafts 36, 50 rotate at the same coordinated speed.

Since shaft 50 is splined, a keyed sprocket 51 (FIG. 6) inside cantilever arm housings 48, 46 may slide along it and yet positively turn with it, without danger of slippage. Accordingly, each of the wheels 60 may also be positively turned by a bicycle chain which is trained over all sprockets. Since each of the rollers 38 and the wheels 60 is positively keyed together, each turns at the same fixed speed. Thus, there is no scuffing of the printed circuit boards by either the rollers or the wheels turning at different speeds with respect to each other.

Suitable sensors detect the presence of a printed circuit board on the bed of rollers 38. In this particular case, the sensors are a pair of "Microswitches" 70, 72. These switches are controlled by pivotally mounted lever arms 74, 76, each having a roller 78 or 80 on its free end. These rollers roll along the edges of the printed circuit boards as they travel between guides 42, 44. Thus, a closing or opening of the "Microswitches" gives an electrical signal for controlling the machine. Among other things, these signals switch "on" or "off" a motor 82 which drives a gear box 84, that supplies the necessary motive power to the various parts of the stacker-loader.

A sprocket wheel 86 is selectively turned by the operation of gear box 84. A bicycle chain 88 trained around sprocket 86 leads the resulting power transfer to a second sprocket 90, from which a second bicycle chain 92 leads the power transfer to a third sprocket 94. Therefore, when a clutch (not shown) selectively operates in gear box 84, the two sprockets 90, 94 turn associated feedscrews (now shown), either clockwise or counterclockwise.

A pair of lift arms 96, 98 are mounted on these feedscrews. Therefore, the lift arms 96, 98 move upwardly or downwardly, depending upon the direction in which the sprocket wheels 90, 94 may turn the feedscrews. Initially, these lift arms 96, 98 move to the top of their travel where limit switches operate to stop their travel at a point where they may receive the first printed circuit board that is laid on them. As successive boards are stacked upon the arms 96, 98, they move downwardly by incremental amounts equal to a thickness of a board, until a full stack is completed. Then, the stack is removed, the lift arms 96, 98 are raised, and the process repeats.

The side rails 100, 102 position cart 32 (FIG. 1) in a position to receive and remove the stack of printed circuit boards.

The exact position of the lift arms 96, 98 is determined by a sensor 104 which is located at the end of travel where the board comes to rest on wheels 60 of cantilever arms 46, 48. Sensor 104 is best seen in FIG. 3, where a first pair of dot-dashed lines 106 represent the end or edge of the printed circuit board on the top of a stack of boards supported on the lift arms 96, 98. A second pair of dot-dashed lines 108 represent the end or edge of a printed circuit board which is being delivered to a loading position. This board in position 108 is the same as the printed circuit board in the position 59, seen in FIG. 1. Sensor 104 has two light sources 110, 112, and two photocells 114, 116, positioned at levels corresponding to the board on top of the stack 106 and to the oncoming board 108. If the light from source 110 is reflected from an edge of a printed circuit board 106 onto photocell 114, it indicates that the stack is the proper height to receive the next board that is to be dropped.

The light from source 112 is reflected from the oncoming printed circuit board 108 to the photocell 116 for a brief interval of time after the delivery of the board to position 59 and before it is dropped onto the stack. Therefore, it is relatively easy to monitor the length of time that photocell 116 receives light. If photocell 116 receives a relatively permanent signal, it could mean that the stack is too high and the top board 106 on the stack is reflecting the light.

Accordingly, the photocells 114, 116 of sensor 104 may transmit signals which selectively operate a clutch in box 84 that controls the turning of sprocket wheels 86, 90, 94. If the photocell 114 does not receive any reflected light, the sprockets 90, 94 drive feedscrews in a direction which raises the lift arms 96, 98. The feedscrews (not shown) continue to rotate until photocell 114 does receive a reflected light, meaning that board 106 on top of the stack is properly positioned. If these arms 96, 98 continue to raise without receiving any signal from photocell 114, it means that no printed circuit board is on the arms 96, 98, and limit switches stop the upward travel.

If reflected light is received by photocell 116, the sprocket wheels 86, 90, 94 turn in a reverse direction until the light disappears. Usually, this is an incremental amount which is equal to the thickness of the printed circuit board that is being dropped. Therefore, normally, the lift arms 96, 98 are lowered by a distance equal to the thickness of one printed circuit board each time that a pulse of light is received at photocell 116. If photocell 116 receives a permanent signal, the feedscrews continue to run until photocell 114 receives reflected light and photocell 116 does not receive any reflected light. Limit switches stop the downward travel of lift arms 96, 98 when the stack is complete.

Means are provided for dropping the printed circuit board from position 59 (FIG. 1) onto the top of the stack responsive to a signal from photocell 116. In greater detail, each of the cantilever arms 46, 48 has a pair of related supports 122, 126 and 124, 128 (FIG. 5), associated therewith. Sliding bearings (such as 120) are used to mount each of these supports on the smooth horizontal bars 52, 54. One (124, 126) of the related pairs 122, 126 and 124, 128 of supports has a threaded nut 129, 131 mounted on the threaded bar 56 so that it is not free to slide. Therefore, the related pairs 122, 126 and 124, 128 of supports for the two cantilever arms 46, 48 move inwardly or outwardly responsive to a turning crank 58 and the threaded bar 56 attached thereto.

The other 122, 124 of each of the related pairs of supports does not have a threaded nut so that it is free to slide on bearings, such as 120. The related pair of supports are connected to each other via individually associated solenoids S1, S2. The related one of the pair of supports which has the nut 129 or 131 associated therewith is immobile. Therefore, when the solenoids operate or release, the sliding supports 122, 124 move outwardly or inwardly. The cantilever arms 46, 48 are mounted on the non-sliding supports 126, 128, respectively. The printed circuit board support wheels 60 are mounted on the freely sliding members 122, 124. The wheels 60 are extended or retracted depending upon whether the solenoids S1 and S2 are, or are not operated.

The effect of the solenoid operation is seen in FIG. 6, where part 124 is shown in solid lines, at the solenoid deenergized position. When the solenoid S2 operates, the part of the cantilever arm which is mounted on support 124 moves to the position shown by the dot-dashed lines. The sprocket wheel 134 which is coupled to turn with the splined shaft 50 (FIG. 2), is mounted on the part 124, and therefore, moves with the operation of the solenoid. Solid with sprocket 134 is a shaft 136 having the wheel 60 mounted thereon. Hence, the wheel 60 is also retracted from the position shown by solid lines to the position within the stationary part 148 shown by dot-dashed lines, when the solenoid operates.

The printed circuit board 59 rests on the wheels 60 when they are in their extended position. When solenoids S1, S2 (FIG. 5) operate movable support parts 122, 124 move toward an outboard position and the wheels 60 move to the retracted position shown by the dot-dashed lines in FIG. 6. This retraction of the wheels from under the printed circuit board 59 causes it to drop onto the top of the stack and into the position 106 in FIG. 2.

Behind the printed circuit board in the drop position 59 (FIG. 1), there is a guide bar 140 (FIG. 7) which has a top end 142 that is slightly lower than the tops of the wheels 60. Therefore, the bottom of the printed circuit board in position 59 rolls directly over the top 142 of guide bar 140. The top of bar 140 is bent outwardly so that, when the board 59 is dropped, its trailing edge 144 is guided and directed forwardly and into alignment with the previously dropped boards stacked on cart 32.

The guide bar 140 is permanently affixed to and mounted on a block 146 which is held in place by two bolts 148, 150, fitted into a selected pair of bolt holes 152. Thus, the block may be relocated and supported at any of the bolt holes 152 in order to accommodate different lengths of printed circuit boards. Small positional adjustments may be made by sliding the block 146 back and forth along the travel permitted by the slots 154, 156.

From the foregoing, it is seen that the width spacing between the horizontal cantilever arms 46, 48 may be adjusted by turning crank 58 and the length of the space defined by the guide 140 may be adjusted by relocating block 146, to fit almost any printed circuit board. The vertical spacing between sensors 110, 114 and 112, 116 may be made as precise as four holes may be drilled into a piece of metal. Thus, there is a very great accuracy. The drop of the board from level 108 to level 106 (FIG. 3) may be made as short as is permitted by the diameter of wheels 60. Therefore, the boards may be caused to drop far enough to entrap a cushion of air between the top of the stack and the bottom of the printed circuit board riding on the wheels. On the other hand, the drop may also be short enough so that the board falls in a flat and untipped condition. The back guide 140 (and any others which may be added, if necessary) insures an alignment of the printed circuit boards on the stack. Therefore, there never is any need to rub one printed circuit board over another.

Those who are skilled in the art will readily perceive how to modify the invention. Therefore, the appended claims are to be construed to cover all equivalent structures which fall within the true scope and spirit of the invention.

The invention claimed is:

1. A stacker-loader for receiving flat boards following each other in sequence along a conveyor and for placing them in a stack of aligned parallel boards, piled one over the other, without any of the boards sliding over each other, said stacker-loader comprising serial delivery means, including a field of driven rollers for sequentially moving the boards after they leave the conveyor, guide means for aligning the boards as they travel along the field of driven rollers, a pair of spaced parallel cantilever arms positioned at the end of the field of driven rollers to receive between themselves each of said aligned boards, said arms having confronting surfaces which act as guides for the boards during transport over the stacking location, dropping means comprising an aligned plurality of wheels mounted on and extending from said confronting surfaces of said cantilever arms for supporting said boards only at the edges of said boards as they move along said arms, and means for retracting said wheels into said arms to drop the boards supported on said wheels in a free fall and unassisted onto the top of a stack of said boards.

2. The stacker-loader of claim 1 and means for driving said wheels to propel said boards along said arms while said wheels are extended from said confronting surfaces.

3. The stacker-loader of claim 1 and first sensor means for detecting oncoming boards at a first level in which they are supported by said extended wheels, second sensor means for detecting boards at a second level which is the top of said stack, the desired distance for said boards to drop onto said stack being the distance between said first and said second levels.

4. The stacker-loader of claim 3 wherein the distance between said first and said second levels being adequate to create a cushion of air between the dropping board and the top of said stack, but not enough to enable said dropping board to tip as it is being dropped.

5. The stacker-loader of claim 1 wherein the tops of the rollers in said field of rollers define a given plane, and including a pair of smooth horizontal bars and a threaded horizontal bar in spaced parallel association with respect to said given plane, each of said cantilever arms having a pair of related supports with sliding bearings mounted on said smooth horizontal bars, one of each of said related pair of supports for each of said cantilever arms having a threaded nut mounted thereon to move along said threaded bar whereby said related pair of supports for said two cantilever arms move inwardly or outwardly responsive to a turning of said threaded bar, the other of each of said related pair of supports being extendibly connected to said one of said related pair which is associated with the same cantilever arm, power actuated means connected between said one and said other of each related pair of supports for extendibly sliding said other related support responsive to the actuation of said power actuated means, and said means for retracting said wheels operating responsive to the sliding of said other related support.

6. The stacker-loader of claim 5 and first sensor means for detecting oncoming boards at a first level in which they are supported by said extended wheels, second sensor means for detecting boards at a second level which is the top of said stack, the desired distance for said boards to drop onto said stack being the distance between said first and said second levels.

7. A method of converting a moving series of boards into a stack of parallel boards, said method comprising the steps of:

(a) propelling said series of boards toward a stacker-loader work station;

(b) moving said boards one at a time into a drop position between confronting surfaces on a pair of spaced parallel arms which act as guides during transport of the boards over the stacker-loader work station;

(c) supporting each of said boards only at the edges of said boards on an aligned plurality of wheels extending from said confronting surfaces of said arms while said boards are being moved into said drop position, each of said boards being supported on said wheels in a position where its surfaces are removed from any adjacent structure which might scratch the surface of said board while being moved;

(d) detecting the end of said movement of said board while it is being supported at its edges by said wheels; and (e) retracting said wheels into said confronting surfaces responsive to the detection of step (d) for dropping said board in a free fall and unassisted onto the top of a stack of said boards.

8. The method of claim 7 and the added steps of:

(f) detecting the level of a stack of previously dropped boards; and (g) lowering a stack of previously dropped boards by an incremental distance equal to the thickness of said board responsive to the dtection of step (d).

9. The method of claim 8 and the added step of centering said boards as they are propelled in step (a) in order to guide and direct them onto said wheels in step (c).

10. The method of claim 9 and the added step of positioning a rolling cart beneath said spaced parallel arms to receive said stack of boards, whereby said stacker-loader may be unloaded by rolling away said cart.

11. A device for converting a moving series of boards into a stack of parallel boards, said device comprising means for propelling said series of boards toward a stacker-loader work station having a spaced parallel pair of confronting arms with a drop space between them; said confronting arms acting as guides during transport of said boards over the work station; means responsive to said boards reaching said work station for moving said boards into said drop space between confronting surfaces on said pair of spaced parallel arms at said work station; means for supporting only the edges of said boards on an aligned plurality of wheels extending from said confronting surfaces of said arms while said boards are being moved into said drop position; sensor means responsive to said boards reaching said drop position for detecting the end of said movement of said boards; said wheels supporting only said edges of said boards in a position which precludes a scratching of surfaces of said boards while they are being moved, and means responsive to said sensor means detecting the end of said movement of retracting said wheels into said confronting surfaces of said pair of arms so that said boards drop in a free fall and unassisted while in a horizontal position and without tipping in order to prevent surface scratching when said dropped board lands on said stack.

12. The device of claim 11 and means for detecting the level of a stack of previously dropped boards; and means for lowering a stack of previously dropped boards by an incremental distance equal to the thickness of said board in response to the detection of the end of the movement of said board at said drop position.

13. The device of claim 12 and means for centering said boards as they are being propelled in order to guide and direct them onto said wheels extending from said confronting surfaces on said arms.

14. The device of claim 13 and a rolling cart beneath said spaced parallel arms to receive said stack of boards, whereby said stacker-loader may be unloaded by rolling away said cart.

* * * * *